United States Patent [19]
Andrus

[11] Patent Number: 5,212,596
[45] Date of Patent: May 18, 1993

[54] NONREFLECTIVE ARTICLES

[75] Inventor: Paul G. Andrus, Powell, Ohio

[73] Assignee: Battelle Memorial Institute, Columbus, Ohio

[21] Appl. No.: 885,087

[22] Filed: May 18, 1992

[51] Int. Cl.$^5$ .............................................. G02B 27/00
[52] U.S. Cl. ................................... 359/614; 359/601; 359/529
[58] Field of Search ............... 359/601, 602, 603, 609, 359/610, 613, 614, 615, 529, 530, 630, 629, 631, 633

[56] References Cited

U.S. PATENT DOCUMENTS

| | | | |
|---|---|---|---|
| 3,948,714 | 4/1976 | Steiner et al. | 359/530 |
| 4,012,115 | 3/1977 | Brown | 359/613 |
| 4,250,217 | 2/1981 | Greenaway | 359/615 |
| 4,473,277 | 9/1984 | Brown | 359/609 |
| 4,548,472 | 10/1985 | Negishi | 359/613 |
| 4,697,881 | 10/1987 | Brown | 359/613 |
| 4,756,603 | 7/1988 | Ohtani | 359/601 |
| 4,883,341 | 11/1989 | Whitehead | 359/601 |
| 4,995,701 | 2/1991 | Brown | 359/601 |

Primary Examiner—Loha Ben
Attorney, Agent, or Firm—Barry S. Bissell

[57] ABSTRACT

An article for presenting dye/pigment images therein comprising a substantially transparent viewing region 20; photodeveloped, printed, deposited or diffused dyes and/or pigments 21 in the viewing region; and a substrate region 22 adjacent to the viewing region. The outer surface 23 of the viewing region is configured in a relief pattern comprising microscopic, smooth, sharp pyramids 31, cones 48, or ridges 29, to provide a series of at least 3 surface reflections of any light impinging thereon, before the light travels toward the viewer's eyes. The reflectivity at any one surface reflection is less than about 5% of normally incident light, so less than about 0.05% (and preferably not more than 0.02%) of such incident light is returned toward the viewer after 3 reflections, and less after 4. A viewer thus can see the dye/pigment images clearly from any direction and free from noticeable reflected light from the outer surface, and without loss of detail or contrast in dark areas.

17 Claims, 4 Drawing Sheets

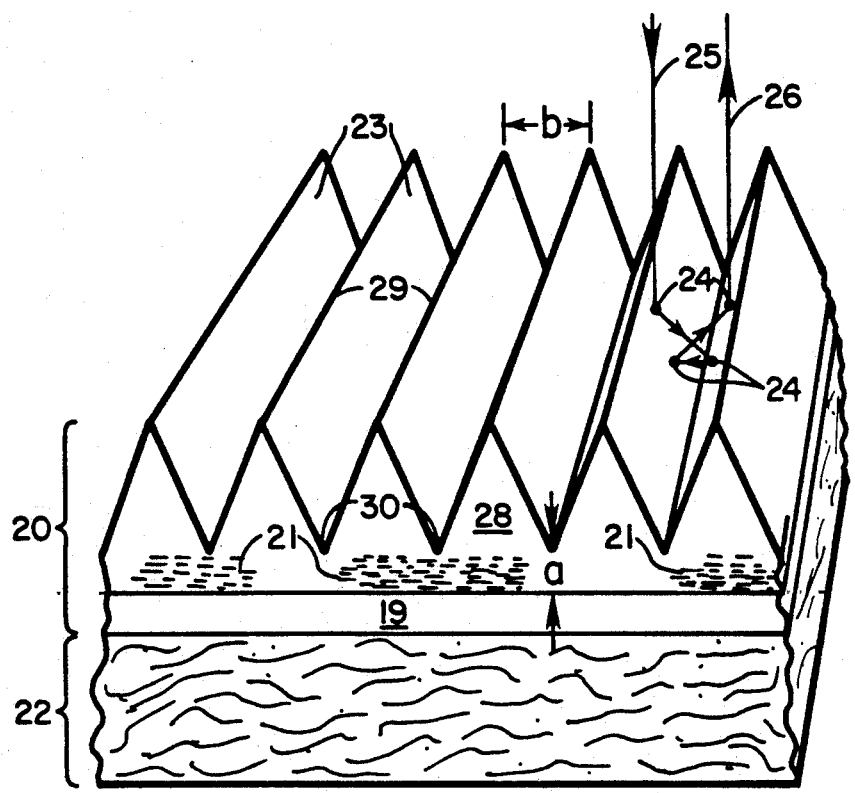
FIG. 3
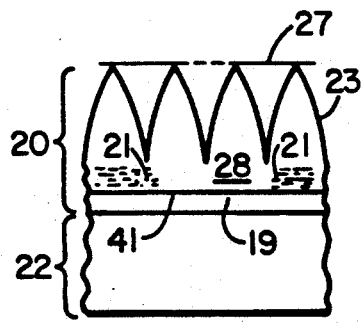     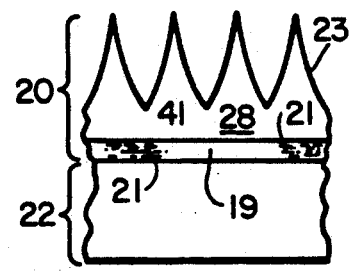     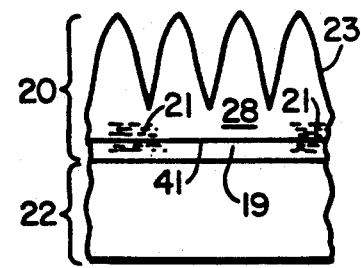
FIG. 4          FIG. 5          FIG. 6

NONREFLECTIVE ARTICLES

FIELD OF INVENTION

This invention relates to articles for presentation of visible matter therein, in particular for presenting images composed of dyes and/or pigments, and to methods of making such articles. The invention is especially useful in providing photographic prints, dye transfer prints, roadway signage, and other patterned or printed surfaces, that are free of surface reflections or glare.

BACKGROUND ART

Glare (also known as specular reflection) produced when light from a bright window or lamp is reflected from the surface of a glossy print can completely mask the image. Although the surface reflects only about 5% of the light (it depends somewhat on the incident angle), the windows or lamps are much brighter than the surfaces they illuminate (typically about 30 times as bright in a business office). So the glare brightness usually is at least equal to the brightness of highlight areas of the prints, and much brighter than dark areas of the prints. The viewer must position or tilt the print to minimize glare, or if the print is held by someone else or is mounted on the wall, the viewer must change position and viewing angle to reduce the glare.

In attempts to make glare less objectionable, some print papers are manufactured with semigloss finishes, in which a microscopically wavy surface scatters the surface reflections to a limited extent. Substantially the same amount of light is reflected as with a glossy print, but the glare appears to the viewer to be less intense since the reflections are directionally scattered. But because of the broader scatter, the glare is harder to remove from view by positioning or tilting the print.

Going even further, print papers are also manufactured with matte finishes in which a microscopically irregular surface scatters the surface reflections to a great extent. In effect, with matte materials the viewer always sees a more or less uniform surface reflection, no matter what the viewing angle is. This uniform surface reflection reduces contrast and significantly grays the portions of the pictures that should be deeply colored or black.

A partial reduction in the light reflected from a picture surface can be made by causing the light to undergo two surface reflections before it reaches the viewer's eye. This approach is used by Whitehead in his "Non-Reflective Graphic Surface Display Device" of U.S. Pat. No. 4,883,341. This device consists of a transparent plate grooved on the top and having its bottom surface in optical contact with the graphic surface being displayed, so that reflections from the graphic surface are eliminated and only reflections from the grooved surface remain.

In Whitehead's preferred embodiment (column 5, line 7 et seq), the grooves have right angle sawtooth profiles, so that glare light reaching the viewer's eyes will have undergone two reflections. At each reflection the light intensity is reduced to about 5% of its intensity before reflection. So after two reflections, the intensity of the glare is only about 5% of what it was with just one reflection (without the grooved display device). This appreciably reduces the glare, but because of the eye's roughly logarithmic response, the glare pattern produced by bright windows or lamps is still visible and distracting.

Another difficulty with Whitehead's preferred embodiment is that the right angle grooves serve as prisms to refract the light coming from the graphic surface. This seriously scrambles the image a viewer sees. For the dimensions Whitehead gives, the graphic surface appears as if it were divided into vertical strips about 1 mm wide, with each odd numbered strip appearing to be displaced about 1 mm to the left, and each even numbered strip appearing to be displaced about 1 mm to the right. This destroys the fine detail in the picture.

SUMMARY OF THE DISCLOSURE

The present invention provides a nonreflective surface for photographic prints and the like that essentially eliminates reflections or glare from the surface while preserving the sharpness of fine detail. This nonreflective surface also makes it possible to see more detail in shadow areas, and it causes deeply colored areas to be more saturated and black areas to be truly black rather than merely dark gray. It improves these optical qualities of the prints without scrambling fine detail and without destroying the print's desirable feel or flexibility. It substantially improves the resistance of the prints to being marked by fingerprints and smudges.

A typical article according to this invention for presentation of visible matter therein, comprises a substantially transparent viewing region, visible matter in the viewing region, and a substrate region adjacent to the viewing region. Typically the visible matter comprises dyes and/or pigments forming images.

The viewing region typically has an outer surface comprising a low reflectivity material that typically reflects less than about 5% of normally incident light and is configured with microscopic relief regions causing more-or-less normally incident light to undergo at least 3 reflections thereon before traveling toward the viewer's eyes. Not more than about 0.05% (and preferably not more than 0.02%) of such incident light is reflected away from the article surface no matter what the incident angle and the viewer thus can see the images clearly and free from noticeable surface-reflected light. Of course, lowering the reflectivity of the material and/or increasing the number of reflections in the relief structure will lower the total light reflected to the viewer. Conversely, increasing the reflectivity of the material and/or decreasing the number of reflections in the relief structure will increase the total light reflected.

Typically the viewing region comprises gelatin, or a plastic, resin, or polymer material, including elastomers. The thickness of the viewing region is typically in the range of about 10 to 250 microns. However, if the image is to be viewed at a distance, as in the case of a billboard, the thickness obviously may be greater. If the image is to be viewed under magnification, the thickness obviously may be smaller.

The outer surface of the viewing region typically comprises a close-packed array of microscopic smooth pyramids, cones, parallel ridges, or approximations thereof, either individually or in combination. We have found the cube corner configuration to be a particularly preferred configuration. The pyramids are preferably right angle or cube corner pyramids and the depressions between the pyramids are preferably right angle or cube corner depressions arranged in the form of a microscaled retroreflector. This arrangement not only causes light to undergo 3 reflections before traveling toward the viewer's eyes, but it also retroreflects. This means that the greatly diminished light that reflects to the viewer's eyes also originates in the vicinity of the viewer's eyes. Since the viewer's face is generally much less bright a source than a window or lamp, its reflection reduced in brightness to 0.02% of its original value will be virtually undetectable. The performance of such a retroreflecting configuration is generally at least as good as a nonretroreflecting pyramid structure that causes light from a lamp to be reflected 4 times before it travels toward a viewer's eyes.

The peak-to-peak separation for adjacent pyramids, cones, ridges or approximation thereof in any direction in the array is typically not more than about 125 microns, and preferably less than 50 microns for viewing fine detail (of photographs, for example). Typically every microscopic area on the outer surface of the viewing region lies at an angle of between 50 and 85 degrees with respect to the macroscopic surfaces.

In the viewing region, the visible matter may reside in the cones, pyramids and/or ridges immediately beneath the outer surface. Or the visible matter may reside below the bottoms of the cones or pyramids or the valleys between ridges, with the cones, pyramids and/or ridges being transparent. Or the visible matter may be distributed in the viewing region in any manner between those extremes.

Although a photographic print is an obvious example of an article where a nonreflective surface is desirable, thereby are many other examples where surface reflections cause a loss in quality, an inconvenience to the viewer, and, in some cases, actual danger to the viewer. In addition to many pictorial examples, other applications include highway signs, decorative surface patterns such as marbling and wood grain, and instruction labels on containers such as a pill bottle.

DRAWINGS

FIG. 3 is a perspective view of another form of the present invention embodying a ridged structure.

FIGS. 4, 5, and 6 are sectional views illustrating typical variations in ridge profile that may be made in an article as in FIG. 3.

Figure 7:
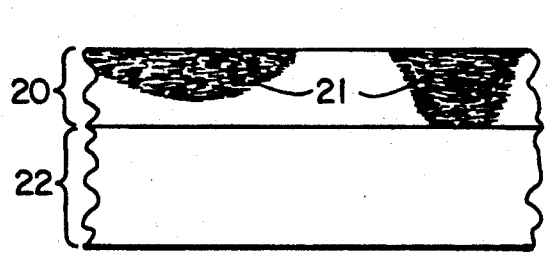

FIG. 7 is a sectional view of a partly completed article according to the present invention.

Figure 8:
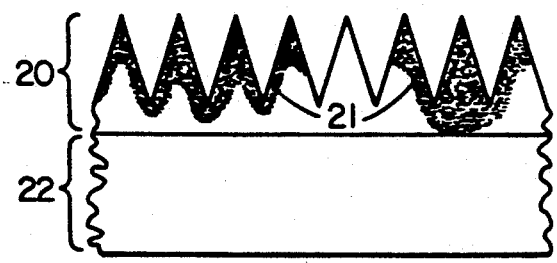

FIG. 8 is a sectional view of a completed article made by embossing an article as in FIG. 7.

Figure 9:
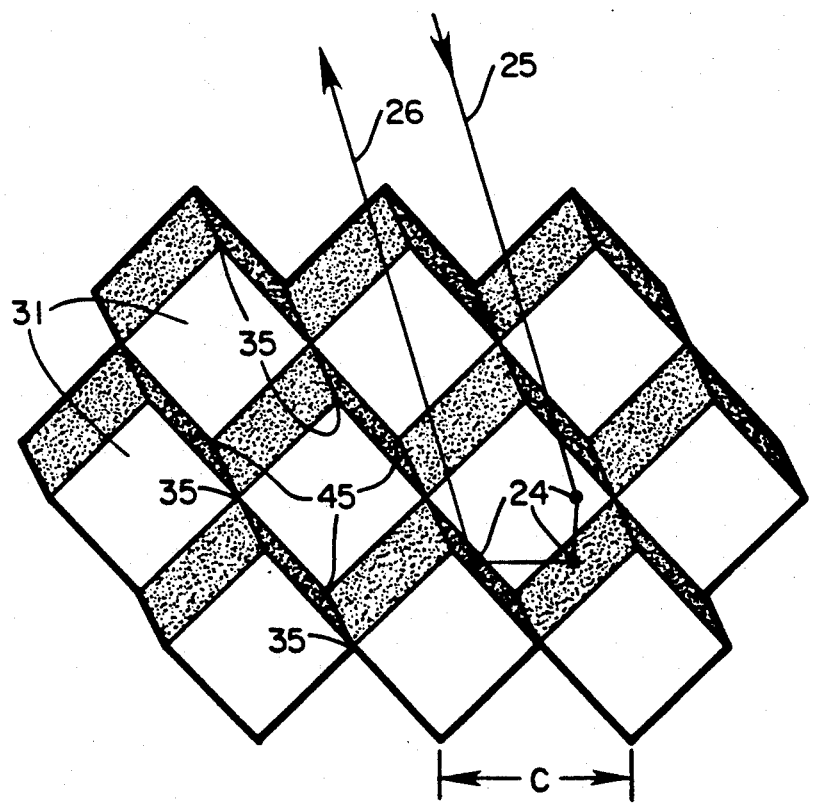

FIG. 9 is a perspective view of a portion of the surface of a typical nonreflective article embodying cube-corner pyramids according to the present invention.

Figure 10:
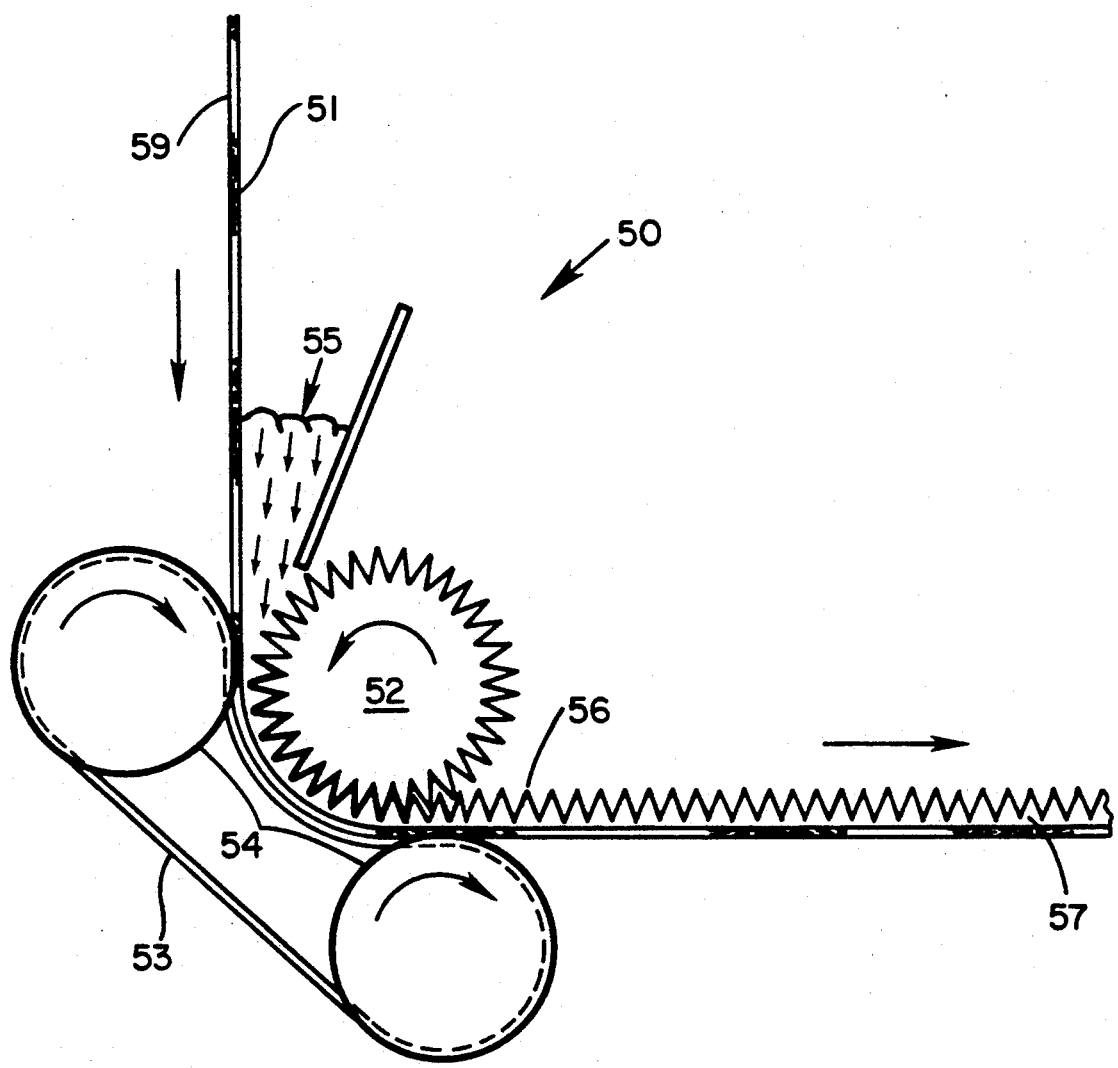

FIG. 10 is a schematic sectional view of typical apparatus for making nonreflective articles according to the invention.

CARRYING OUT THE INVENTION

Figure 1:
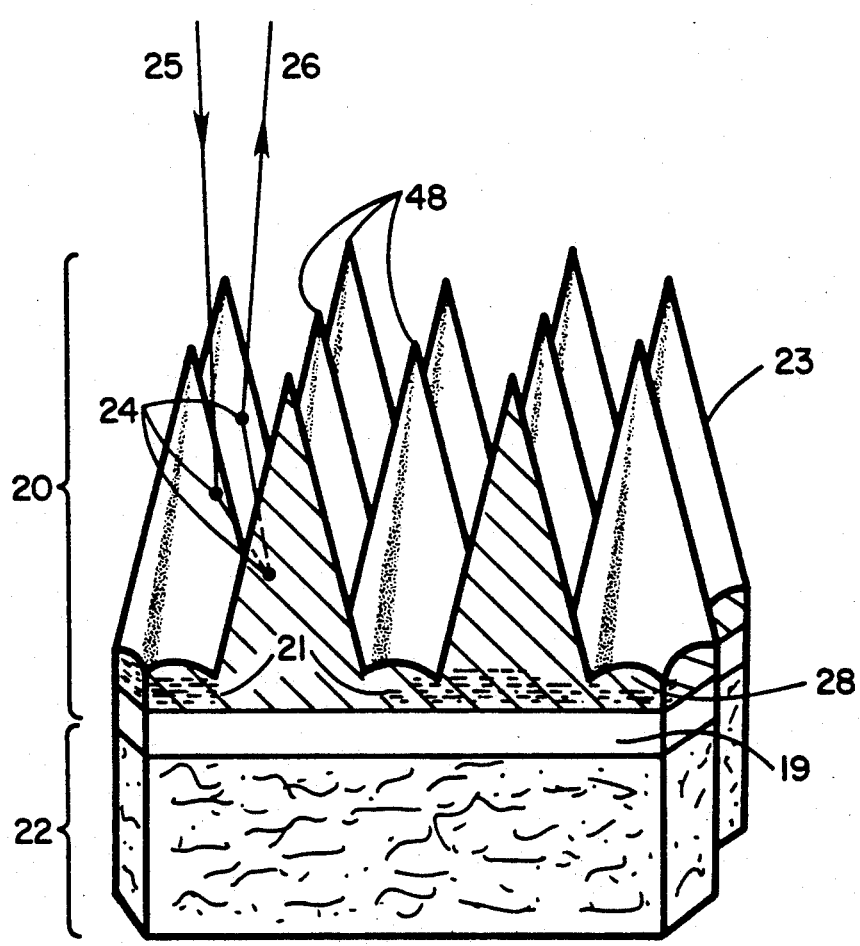
FIG. 1 is a perspective view of a portion of a nonreflective article embodying close-packed cones according to the present invention for presentation of visible matter therein.
Figure 2:
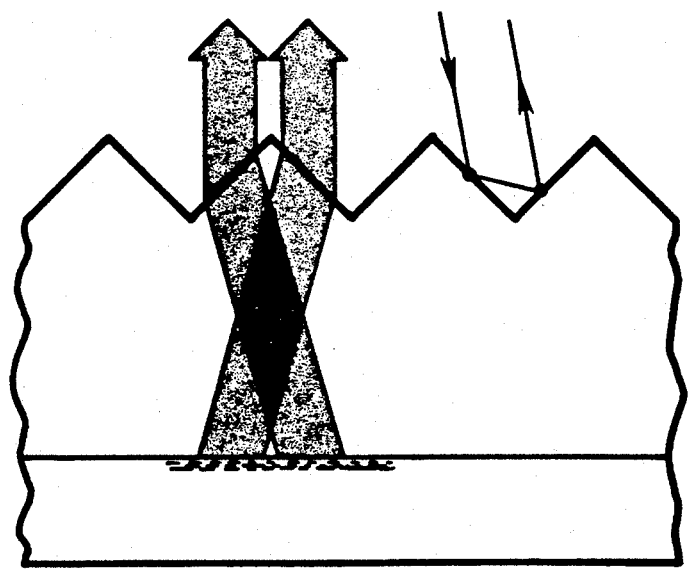
FIG. 2 is a sectional view of a portion of a nonreflective article employing a prior art structure.

Looking at FIG. 2, a prior art structure for reducing reflection as taught by Whitehead (U.S. Pat. No. 4,883,341) is shown. Right angle grooves serve to provide two reflections of incident light before return to the viewer. The sawtooth ridges also act as prisms to refract the light returning from the graphic surface. As the dimension between the bottoms of the ridges and the image material (the dimension "a" in FIG. 3) increases or as the ridges themselves become larger, the image becomes more scrambled to the viewer. For the dimensions Whitehead gives, the graphic surface appears as if it were divided into vertical strips about 1 mm wide, with each odd numbered strip appearing to be displaced about 1 mm to the left, and each even numbered strip appearing to be displaced about 1 mm to the right.

Referring now to FIGS. 1 and 3–9, a typical article according to this invention for presenting visible matter comprises a substantially transparent viewing region 20, visible matter (e.g. dyes and/or pigments) 21 in the viewing region 20, and a substrate region 22 adjacent to the viewing region 20. The viewing region 20 typically has an outer surface 23 comprising a material that reflects about 5% of normally incident light and is configured with microscopic smooth cones, pyramids and/or ridges to provide a series of at least 3 reflections 24 (FIGS. 1, 3, and 9) of any light impinging thereon at 25, before the light travels away from the article at 26. This means that less than about 0.05% (and preferably not more than 0.02%) of such incident light is reflected by the outer surface toward the viewer's eyes no matter what the incident angle. The viewer can see the images clearly from any direction, free from noticeable surface-reflected light. Of course, the remainder of the incident light is transmitted into the viewing region where it is either absorbed or reflected (scattered) back out of the viewing region (largely by the visible matter) and away from the article. The invention reduces the glare or amount of light reflected from the outer surface. We will refer to the total light returning to the viewer or away from the article as including the small amount of light reflected from the surface (glare) and the relatively large amount of light which is reflected or scattered back out of the article from the transmitted light returning from the viewing region. Typically the total light returning to the viewer is greater than about 5% of the incident light meaning that, since the surface reflection is less than about 0.05%, contrast between image light and glare light is very high. Of course, small regions of the viewing region may contain visible matter which absorbs most of the incoming light as, for example, with black regions of a photograph or roadway sign, but when we refer to the total light we mean an average over a representative area of the viewing region rather than one specific subregion.

As best seen in FIGS. 1 and 3–6, the viewing region comprises an outer layer 28 of formable material which is processed to create the relief pattern. The viewing region may also comprise an inner layer 19 between the outer layer 28 and the substrate 22. As shown in FIGS. 3 and 4, the visible matter may all be contained in the formable outer layer 28. Alternatively, all of the visible matter 21 (FIG. 5) may be contained in the inner layer 19 or, as shown in FIG. 6, a portion of the visible matter 21 may be contained in each layer. If all the visible matter is contained in the formable outer layer, obviously the inner layer may be omitted. The distance or thickness between the visible matter and the bottoms of the ridges, pyramids or cones (thickness "a" in FIG. 3) is important in that the larger the thickness the more optical scrambling will occur to the viewer. It is therefore preferred to keep the visible matter all within the array of pyramids and cones when possible, or if not possible, then to keep the thickness as small as possible to minimize the scrambling. Preferably, the thickness is less than 125 microns for low-detail purposes and for greater detail (such as in photographs), the thickness is preferably less than 50 microns to preserve the fine detail.

Typically the viewing region 20 comprises gelatin or a plastic, resin, or polymer, including elastomers. Polyolefin, polyester, polyether, polyurethane, or silicone materials are preferred. The substrate region 22 typically comprises paper, cardboard, or other thin supporting material.

A typical embodiment of this invention is a photographic print or the like having its emulsion or other layer containing the dyes and/or pigments forming the image configured in a microscopic relief pattern such that most of the light reaching the eye from surface reflections from the print will have undergone at least 3 surface reflections before it reaches the viewer's eye. The outer surface 23 of the viewing region 20 typically comprises a relief pattern of an array of pyramids 31 (FIG. 9) or an array of cones 48 (FIG. 1) or adjacent sharp ridges 29 and valleys 30 (FIG. 3), or approximations and/or combinations thereof. The relief pattern is typically produced by a molding or embossing operation in which the layer is softened by heat, solvents, or other means, and is pressed against a mold which is the negative of the relief pattern desired. The molded layer is permitted to harden by cooling, polymerization, or other means, to a sufficient extent that it can be detached from the mold without degrading the fine pattern.

Though the relief pattern may be any one of several microscopic projection and depression patterns or a combination of two or more such patterns, we have found an effective pattern is an array of microscopic, smooth, sharp pyramidal projections close packed so that no flat areas remain.

For instance, a plane can be divided into a square grid, with each square covered with a pyramid having four sides rising above the plane to a point. We have found that a structure having pyramids 125 microns on a side and 150 microns high to be a good nonreflecting relief surface. Since a small fraction of incident light may be reflected directly from the junction lines between pyramids, a better relief structure is one which eliminates the junction lines by making every other square a pyramidal depression rather than an elevation. The same sort of relief structure can be fabricated with triangular pyramids with alternating raised and depressed regions, making another excellent nonreflecting surface.

Pyramid arrays as described above tend to show lower reflectivities as the pyramids are made more acute and the number of reflections increases. Surprisingly then, an important case for pyramidal structures is the condition shown in FIG. 9 where the pyramids are not acute, but are so-called right angle or cube corner pyramids because they have the same shape as the corner of a cube. Looking down on the structure in FIG. 9, in three dimensions, the adjacent pyramids in the array 31 would have corners 35 rising above the plane of the paper and corners 45 depressed below the plane of the paper.

Even more surprising is that this excellent nonreflective array of cube corner pyramids is similar to the cube corner structure used in retroreflectors. In the latter application, the goal is to maximize reflection rather than absorption. In both applications the structures cause normally incident light to be reflected 3 times before return, and cause the reflected light beam to be exactly parallel with the incident light beam.

In the nonreflective application, the fact that the incident and reflected beams must be parallel means that the incident beam must originate at the viewer's face, a source that is rarely as bright as the light sources (e.g. lamps and windows) or background. The further reduction of the intensity of this incident light from the viewer's face by the 3 reflections reduces the intensity to a level that is imperceptible to the unaided eye. Thus, the cube corner relief structure produce a particularly effective, and surprising, nonreflective surface.

The retroreflecting configuration has the added advantages that the pyramids may be less acute than otherwise would be required (for a given performance level) and therefore are more rugged. The overall thickness of the layer may be less, and the structure is easier to clean.

Another simple and effective pattern is a series of microscopic, smooth, sharp ridges having an acute triangular profile providing the 3 or more reflections needed to give the desired nonreflective effect. The fine, ridged structure allows the nonreflective benefits without the scrambling of prior art large structures.

For pyramids and cones, the distance "c" (shown in FIG. 9) between any point on any pyramid or cone and a similar point on the next pyramid or cone in any direction in the array typically is less than about 125 microns, and preferably less than 50 microns for viewing fine detail. Alternatively, the viewing region 20 may comprise substantially parallel, and typically straight, adjacent sharp ridges 29 and valleys 30, wherein the distance "b" (shown in FIG. 3) between each ridge 29 and the next typically is less than less than about 125 microns, and more preferably less than about 50 microns for fine detail. The height of the pyramids or ridges is typically less than 250 microns.

Typically every microscopic area on the outer surface 23 of the viewing region 20 lies at an angle between 50 to 85 degrees with respect to the macroscopic surface (such as the plane 27 in FIG. 4 defined by the locus of points on the tips of the cones, pyramids or ridges).

The pyramids, cones and/or ridges, may be modified to have other shapes, arrangements and/or heights. For example, the ridges 29 and valleys 30 are shown in FIG. 3 as being straight, but may have other shapes, such as zigzag or smooth curves, such as sine waves. The pyramids, cones and/or ridges may have their sides convex as in FIG. 4, concave as in FIG. 5, or partly convex and partly concave as in FIG. 6. Also the pyramidal and conical surfaces may be intermingled with similar shapes whose apexes are pointed inward to form surfaces, somewhat like that of FIG. 9, that are substantially free of lines parallel to the macrosurface of the article. The height of the individual pyramids, cones and/or ridges may indeed vary uniformly or randomly, which may be of additional benefit in reducing any tendency of the surface to act as a diffraction grating.

Techniques for producing the molds for embossing these fine patterns are known in the art. The molds may be metal or silicone rubber or other common mold materials, and they may be in the form of plates or rollers or other forms commonly used for producing microscopically patterned plastic films.

FIG. 10 is a schematic sectional view of typical apparatus 50 for making nonreflective articles according to the invention. A web of photographic print material 59, carrying dye/pigment image material 51 near its surface, is fed between a heated embossing roll 52 and a back up web 53 supported by back up rolls 54. The ridges on the embossing roll almost contact the photographic print material 59. A heat-curable, transparent elastomer 55 is injected into the gap between the embossing roll 52 and the face of the photographic print material 50, where it is cured in a pattern of ridges 56 on the embossing roll 52. The output of the apparatus is a nonreflective photographic print having a pattern of ridges 56 in cured elastomeric material 57 immediately above the image material 51.

It is not necessary to add a layer of heat-moldable material if the surface of the print is moldable. Modern thermal dye transfer prints in which dye has been caused to transfer from a donor sheet to a plastic coated receiver sheet due to the action of a thermal print bar are well adapted to molding. After the dye has been transferred and caused to migrate into the plastic layer, the sheet is embossed in a heat molding step, which can be a final operation in the print making machine. This is shown in FIGS. 7 and 8 where all the visible matter 21 defining an image is located in the viewing region 20 comprising a formable material. An embossing roll such as shown in FIG. 10 is used to create a pattern of ridges containing the visible material, as shown in FIG. 8.

An alternative procedure is to first mold the plastic layer to produce the nonreflective surface, and then thermally transfer, possibly by sublimation, the dye to the plastic. In this case the dye must be able to migrate a short distance into the plastic at a temperature low enough that the sharp points of cones or pyramids or sharp edges of the ridges are not rounded or distorted.

Similarly, a silver halide photographic material might be manufactured with a surface having the desired nonreflective relief pattern that would be preserved through exposure, processing, and drying. Such a photographic print might exhibit the ultimate in image sharpness and fidelity.

If the prints are to be subject to handling, the surface should be as tough as possible so that handling will not permanently deform the sharp points or edges that are needed in the nonreflective structure. A particularly useful group of materials are the transparent elastomeric materials such as a number of polyurethane rubbers. When scraped or mashed, the sharp edges or points deform readily but immediately bounce back to the original shape when the force is removed. Dyes can be caused to migrate into clear colorless polyurethane rubber to form excellent color images that can then be embossed to form the nonreflective structure. Alternatively, if the plastic layer of the print material has certain dye receiving properties that cannot be duplicated in a thermoplastic elastomer, it can be overcoated with a thin layer of thermoplastic elastomer and the two layers embossed to produce a tough hybrid structure. This technique is also useful for producing the nonreflective structure on prints that cannot be readily molded. Thus a silver halide type color print can be provided with a nonreflective viewing surface by coating it with a thermoplastic layer and then embossing the modified print.

Although less desirable from the standpoint of providing the ultimate resolution in a nonreflective print, it also may be a practical necessity to emboss the nonreflective surface on a film that can be laminated to the substrate and visible matter, such as conventional color prints. Since the laminatable film must have some thickness at the bottoms of pyramids, cones, or ridges, the nonreflective surface will be slightly above the visible matter and some slight optical scrambling can occur. However, the thickness can be so small that any blurring of the image will not be perceptible to the unaided eye.

Surfaces having a microscopic relief pattern that greatly reduces reflections can be molded in a variety of plastic materials by relatively simple molding techniques. We have molded such surfaces in polyurethane rubber principally because of the toughness of the rubber and the fact that when it is deformed by a fingernail, or other sharp object, it quickly returns to its original shape and does not show any permanent deflection. We have also molded structures of this sort in heat moldable nylon materials, in polyethylene materials, and in silicone rubber materials. Silicone rubber materials can be used in a heat curing cycle rather than just a thermoplastic molding cycle. The final silicone rubber product is not as tough as some polyurethane rubbers, but a tough grade of silicone rubber might be devised that would be comparable to polyurethane. Other families of plastic materials also might be used in a heat curing cycle. There are grades of heat-curable, gum rubber that are very nearly colorless and clear, and might be used in forming a satisfactory coating.

A heat curing formulation can be embossed continuously with a heated metal embossing roll, with no need to cool the combination of the plastic and the mold down to a temperature below the solidification temperature of the plastic. The heat curable material can solidify at the high temperature and be peeled away from the mold while still hot.

We were able to produce a suitably textured sheet of Dow Corning X5-8027 silicone rubber having an excellent ridge structure at a rate of about 25 cm per minute. Higher rates also should be possible. Information from Dow Corning on noble metal catalyzed silicone rubbers indicates that they will cure in very thin layers at considerably higher speeds, 5 times as fast or faster.

To produce the molds for these molding operations, one must start with a master pattern that has the fineness of structure, the angles that are desired, the surface smoothness, etc. Riston 1230 Photoresist (E.I. du Pont de Nemours & Company, Inc.) may be used to make arrays of tiny cones or pyramids. Each cone or pyramid is formed by photohardening the photoresist that is in the converging light beam from a microscope objective. The beam is directed through a glass plate supporting the photoresist and is focused to converge to a point at the surface of the photoresist layer. After the unhardened material is dissolved away with solvents, a small cone or pyramid remains.

Using laser light, the tip of the cone or pyramid can be made almost vanishingly small, as small as the wavelength of the light used, or smaller.

A typical method begins with coating an appropriate thickness of the photoresist material, typically about 75 microns, on a thin plate of glass, such as microscope cover glass stock. The exposure then is made through the glass into the photoresist material. The glass provides a surface to support each cone or pyramid. Using a step and repeat procedure, slightly overlapping cones or pyramids can be formed at the rate of about 1 per second with a helium cadmium laser and a traversing table. Pyramids are formed by directing the laser beam through an aperture of the desired shape: triangular, square, rectangular, etc. Surfaces comprising fine ridges with sharp edges are formed by operating the table in a smooth traversing mode rather than a step and repeat mode.

After exposure, the material is developed with solvents to produce sharp points (or sharp edges) at the outer surface. It is more difficult to get the bases of the cones or ridges to be as cleanly developed as the pointed outer ends. The hardened photoresist swells to a certain extent in the developing liquids, and the swelling may interfere with dissolving out the unhardened resist in the narrow slots between cones or ridges. This difficulty may be avoided by using a positive working resist instead of the negative working resist. Positive working resists are particularly useful with the finer patterns needed in the present invention.

The above procedure produces the master. The hardened photopolymer is a somewhat brittle material that is difficult to use directly as a mold. It is more desirable to produce a mold from the master and then use it to produce copies. Such a procedure enables one to make copies having exactly the same shape as the master rather than being the inverse or the negative of the shape. In some cases, such as with the ridged structure, the inverse shape or the negative is similar to the original shape, but with slight differences in the sharpness of the valleys or the ridges.

A simple way to make a negative that can serve as a mold is to coat the photoresist with a layer of room temperature vulcanizing (RTV) silicone rubber. We have used General Electric RTV-31 silicone rubber, because it is a relatively tough material with ability to preserve fine details. A small amount of hardening agent is mixed into the viscous rubber, and the mixture is deaerated to remove any air bubbles from the material. It is poured in a thin layer over the photoresist master, deaerated again to make sure that the rubber penetrates into all the tiny grooves, and then finally set aside to curve, generally overnight. The cure seems to be best when the combination is held slightly above room temperature, but the curing of RTV-31 is not greatly accelerated by increasing the temperature. The cured silicone rubber can be easily stripped from the photoresist. Silicone rubber has good self release properties, so a thin layer can be peeled easily from the photoresist surface, and the silicone rubber negative is then ready to be used as a mold.

Silicone rubber has good release properties and ability to preserve detail, but a silicone rubber mold might not last for the thousands or millions of molding operations that one would like to get out of it. For such situations a metal mold is more desirable. A metal mold can be made by putting the photoresist master in a vacuum system and vacuum depositing a metal (nickel, for instance) on its surface in a thick enough layer that it is a good conductor. The coated master is then placed in an electroplating bath. We have used sulfamate nickel electroplating baths because they can produce relatively stress-free layers. Plating is carried out until a thickness of about 125 microns of nickel is obtained. This can then be separated from the photoresist and used to mold rubber materials.

Polyurethane rubber materials can be molded with the nickel mold, but a release agent is required. Without the release agent the polyurethane rubber would serve as an excellent adhesive for bonding the print to the nickel mold. Various release agents are thin enough and effective enough not to degrade the fine lines, sharp edges, and other details. Some dilute detergent solutions such as Dreft and sodium lauryl sulfate work well. Applying paraffin release layers by a vacuum deposition process is another good way to get an extremely thin uniform release layer on the mold. Some polyurethane materials have release agents compounded in the material so that they can be shaped by metal molds with no need for a separate release agent.

The processes described above are fine for flat plate type applications. We have used them to make molds that are about 10 cm square, and one can make larger molds by the same techniques. However, in many cases it would be desirable to have an embossing roll to produce long strips of material having the desired surface pattern. Or the embossing might be done right on a strip of print material coming out of a photographic printing machine. We have made embossing rolls to do this by exposing photoresist on a cylinder rotating slowly in front of a microscope objective through which the laser beam is projected. A master cylinder is produced from which we have made nickel embossing rolls that do not have a seam. We have used these rolls to produce patterned silicone films at a rate of about 25 cm per minute.

Other ways of making masters and molds do not involve photoresist materials. The grooved or ridged surfaces can be formed mechanically. For example, one can machine, or turn in a lathe, a cylinder having a very fine groove that is cut out with a highly sharpened and polished tool. The grooved cylinder can be nickel, aluminum, or other metal which may be used directly as an embossing roll. Or the groove might be cut in a cylinder of a plastic, wax, or other material commonly used to cut phonograph disks, and an embossing roll replicated from it.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

What I claim is:

1. An article for presentation of visible matter therein, comprising
a substantially transparent viewing region,
visible matter in the viewing region, and
a substrate region adjacent to the viewing region,
the viewing region comprising an outer layer and an outer surface thereon comprising a low reflectivity material configured to provide a series of at least 3 reflections of light normally incident thereon so that not more than about 0.05% of such incident light is reflected away by the outer surface and the remainder of the incident light is transmitted into the viewing region, whereby at least about 5% the transmitted light is scattered by the visible matter back toward a viewer, and so that the viewer thus can see the visible matter clearly and free from noticeable reflected light from the outer surface.

2. An article as in claim 1, wherein at least a portion of the visible matter is located in the outer layer.

3. An article as in claim 2, wherein the outer surface comprises adjacent sharp ridges and valleys, an array of pyramids, an array of cones or combinations thereof.

4. An article as in claim 3, wherein the viewing region comprises also an inner layer of another material between, and in intimate contact with, the outer layer and the substrate region.

5. An article as in claim 4, wherein at least a portion of the visible matter is located in the inner layer.

6. An article as in claim 4, wherein the inner layer is about 10 to 250 microns thick.

7. An article as in claim 2, wherein the outer layer is about 10 to 250 microns thick.

8. An article as in claim 1, wherein the outer surface comprises adjacent sharp ridges and valleys.

9. An article as in claim 8, wherein the outer layer is about 10 to 250 microns thick.

10. An article as in claim 9, wherein the peak-to-peak separation between any ridge and the adjacent ridge in either direction is not more than about 125 microns.

11. An article as in claim 1, wherein the outer surface comprises adjacent sharp ridges and valleys, an array of pyramids, an array of cones or combinations thereof.

12. An article as in claim 11, which comprises an array of pyramids or cones or combinations thereof wherein the distance between any point on each pyramid or cone and any point on the nearest other pyramid or cone in any direction in the array is not more than about 250 microns.

13. An article as in claim 11, wherein the outer surface comprises an array of right angle or cube corner pyramids.

14. An article as in claim 13, wherein at least a portion of the visible matter is located in the outer layer.

15. An article as in claim 14, wherein the peak-to-peak separation between any pyramid and the nearest other pyramid in any direction in the array is not more than about 125 microns.

16. An article as in claim 15, wherein the outer layer is about 10 to 250 microns thick.

17. An article as in claim 11 wherein the individual pyramids, cones, or both, or approximations of either or both are of uniformly irregular or randomly irregular height.

* * * * *